United States Patent
Schleucher et al.

(10) Patent No.: US 7,666,073 B2
(45) Date of Patent: Feb. 23, 2010

(54) CLOSURE CLIP WITH ROUND BOTTOM

(75) Inventors: Heiko Schleucher, Gedern (DE); Klaus Hein, Gedern (DE)

(73) Assignee: Poly-Clip System GmbH & Co. KG (DE)

( * ) Notice: Subject to any disclaimer, the term of this patent is extended or adjusted under 35 U.S.C. 154(b) by 0 days.

(21) Appl. No.: 12/048,318

(22) Filed: Mar. 14, 2008

(65) Prior Publication Data

US 2008/0227376 A1  Sep. 18, 2008

(30) Foreign Application Priority Data

Mar. 16, 2007  (DE) .................. 10 2007 012 776

(51) Int. Cl.
*A22C 11/00* (2006.01)
(52) U.S. Cl. ........................................... 452/48
(58) Field of Classification Search ............ 24/30.5 W, 24/20 CW, 20 W, 20 R, 115 A; 53/577; 452/30–32, 452/35–37, 48, 51
See application file for complete search history.

(56) References Cited

U.S. PATENT DOCUMENTS

| | | | | |
|---|---|---|---|---|
| 2,972,791 A | * | 2/1961 | Kelem | ..................... 24/30.5 W |
| 3,189,961 A | * | 6/1965 | Heller | ..................... 24/20 TT |
| 3,564,663 A | | 2/1971 | Roberts | |
| 4,200,962 A | * | 5/1980 | Niedecker | ................ 24/30.5 W |
| 4,308,641 A | * | 1/1982 | Niedecker | ................ 24/30.5 W |
| 4,402,113 A | * | 9/1983 | Smith | ......................... 24/20 R |
| 5,497,645 A | * | 3/1996 | Niedecker | ..................... 72/330 |
| 6,233,791 B1 | * | 5/2001 | Theis | ....................... 24/135 R |
| 6,401,306 B1 | * | 6/2002 | Hanten et al. | ........... 24/30.5 W |
| 7,347,454 B2 | * | 3/2008 | Martus | ......................... 285/23 |

FOREIGN PATENT DOCUMENTS

| | | |
|---|---|---|
| DE | 1 779 750 A1 | 9/1971 |
| DE | 26 06 658 A1 | 9/1977 |
| DE | 81 35 877 U1 | 10/1984 |
| DE | 33 39 834 A1 | 11/1985 |
| DE | 90 00 936 U1 | 7/1990 |
| EP | 0 081 250 A1 | 6/1983 |
| GB | 774 267 | 9/1957 |
| GB | 1 206 090 | 5/1969 |

* cited by examiner

*Primary Examiner*—Thomas Price
(74) *Attorney, Agent, or Firm*—Hahn Loeser & Parks LLP; Michael H. Minns

(57) ABSTRACT

A closure clip for products in bag or sausage form, the packaging cover material of which is formed from at least one packaging film, wherein the closure clip has a clip bottom and two straight clip legs which adjoin the clip bottom in the same direction and which diverge away from each other away from the clip bottom and the central longitudinal axes of which and the central longitudinal axis of the clip bottom lie in a common plane. It is further provided that the clip bottom has a rounding in the form of part of a circular arc.

19 Claims, 5 Drawing Sheets

B - B

D - D

CLOSURE CLIP WITH ROUND BOTTOM

BACKGROUND OF THE INVENTION

Figure 1:
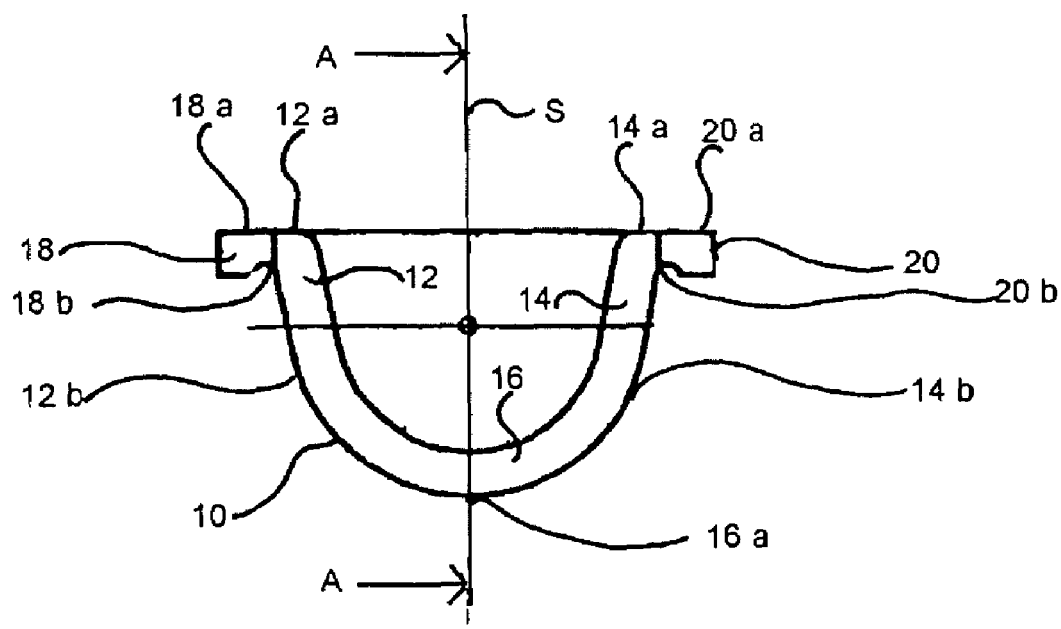
Figure 1:
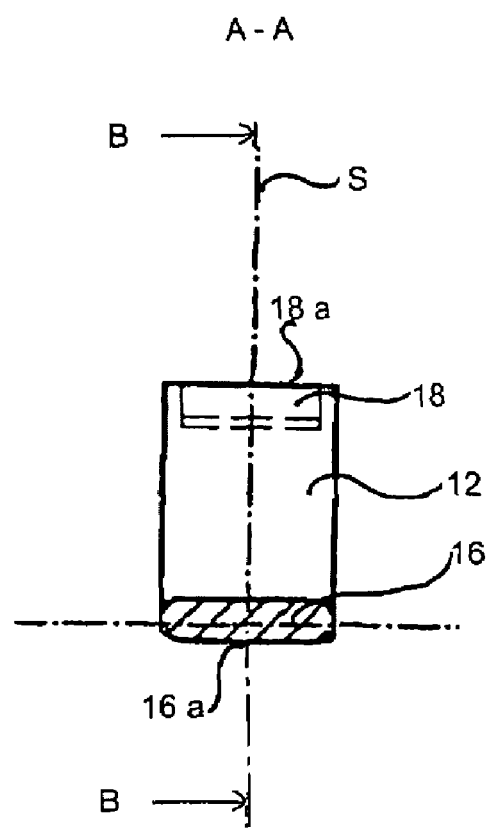
Figure 1:
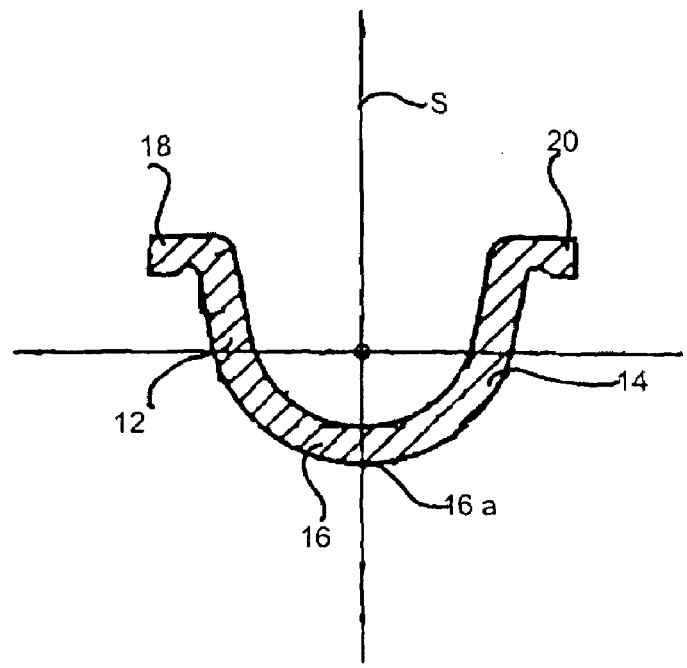
Figure 1:
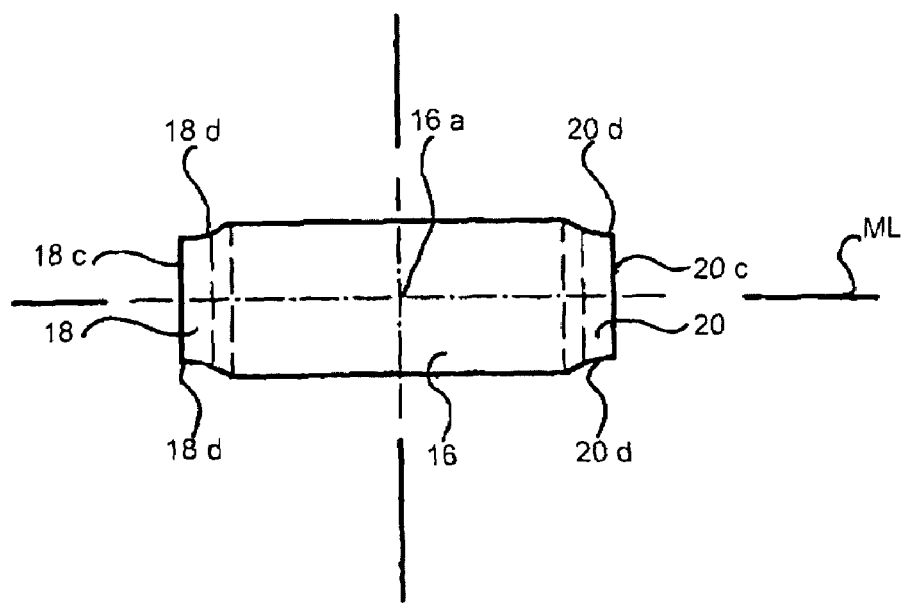

The invention concerns a closure clip for products in bag or sausage form, a clip line formed from those closure clips and a die for processing the closure clips.

In particular the invention concerns a closure clip for products in bag or sausage form, the packaging cover material of which is formed from at least one packaging film, wherein the closure clip has a clip bottom and two straight clip legs that adjoin the clip bottom in the same direction and diverge away from each other away from the clip bottom and the central longitudinal axes thereof and the central longitudinal axis of the clip bottom lie in a common plane. The invention further concerns a clip line comprising those closure clips and a die for processing of those closure clips.

Closure clips or clips of the specified kind are used for example for closing sausage packagings. The closure operation is done by special machines such as clipping machines that are arranged downstream of corresponding automatic filling apparatuses for feeding the product to be packaged and introducing it into the packaging. To close a product in sausage form, a portion of the packaging cover material, which is gathered together in the form of a twisted plaited portion is introduced into the closure clip that in turn is held in a die that has a shape corresponding to the shape of the clip bottom. Thereupon the legs of the clip are closed around the plaited portion of the packaging by means of a ram which is moved against the die.

German utility model No 90 009 36 discloses a closure clip of the kind for use on products in bags or sausage form, which has a clip bottom and two straight clip legs that adjoin the clip bottom in the same direction and are mutually divergent away from the clip bottom, wherein the central longitudinal axes of the clip legs and that of the clip bottom are disposed in a common plane. In that case, the clip bottom extends straight so that, in a plan view, that previously known closure clip is in the shape of the letter 'U' with side limbs that diverge away from the clip bottom. Admittedly, in that known closure clip, the corners where the straight clip bottom goes into the straight clip legs are rounded off, but those roundings only involve a small radius of curvature. That means that, when the closure clip is closed in a clipping machine such as a die and a ram, a kinking fold can be formed at those corners, whereby a crack is produced within the closure clip. That crack weakens the closure clip so that it breaks under an only slight further loading and thus loses its closure function.

SUMMARY OF THE INVENTION

An object of the present invention is to provide a closure clip for use on products in bags or sausage form, in which, in spite of a high level of closing force and the considerable deformation of the clip that this entails, crack formation in the clip is reliably avoided. A further object of the invention is to provide a clip line consisting of such closure clips of that kind as well as a die for processing those closure clips or clip line.

In particular there is proposed a closure clip for products in bag or sausage form, the packaging cover material of which is formed from at least one packaging film or a non-woven packaging material or a packaging fiber material, wherein the closure clip has a clip bottom and two straight clip legs that adjoin the clip bottom in the same direction and are mutually divergent away from the clip bottom and the central longitudinal axes thereof and the central longitudinal axis of the clip bottom are in a common plane, and wherein that closure clip has a configuration where the clip bottom is rounded in the form of part of a circular arc. That round shape of the clip bottom avoids corner transitions between the clip bottom and the clip legs so that, when the clip is closed, cracking is reliably avoided. In addition, the closure clip according to the invention is gentle with the packaging cover material as the closure clip can be formed in the optimum fashion around a portion of the packaging cover material, which is gathered together to form a plaited portion. That also markedly increases the closing or retaining force. Furthermore, the round shape of the closure clip makes it easier to adapt the clip sizes to packaging covers that are thinner.

If the transitions from the clip bottom to the two clip legs have a steady or uniform configuration, that further assists with avoiding cracking.

The effect of gently and carefully surrounding the packaging cover material in the region of the plaited portion formed therefrom, as has already been mentioned hereinbefore, is also further assisted if the transition from the clip bottom to the two adjoining clip legs is of a steady or uniform configuration.

In principle, the closure clip according to the invention can assume any desired cross-section. A particularly advantageous configuration of the closure clip has a cross-section that is substantially in the shape of an oval or an ellipse. In that respect, the oval can be elongate, in which case preferably the length of the major axis of the oval is a multiple of the radius at the vertices of the ellipse.

To permit coding of the closure clip by embossing corresponding items of information on the clip, it is further advantageous if the oval has straight or flat longitudinal sides extending at least approximately parallel to the major axis of the oval. By virtue thereof the embossing produced can be of a suitable size so that it can be seen with the human eye. A suitably shaped ram can be provided for applying the embossing to the part-arcuate clip bottom.

To achieve uniform deformation of the closure clip in all regions, it is further advantageous if the closure clip is of a material thickness that remains at least approximately the same substantially over its entire length.

The closure clip according to the invention can be manufactured from the most widely different materials and the most widely varying semi-manufactured articles. Particularly, simple manufacture can be achieved by the closure clip being made from a wire, preferably aluminum.

To form a clip line comprising closure clips that are joined together, it is further advantageous if connecting extensions facing away from the axis of symmetry of the clip are provided at the free ends of the clip legs. In that case it is advantageous if the connecting extensions are preferably angled outwardly at an angle of at least approximately 90° relative to the axis of symmetry of the closure clip. Furthermore, the surfaces of the connecting extensions, which face away from the apex point of the part-arcuate rounding of the clip bottom, can be at least partially disposed in the same plane that preferably intersects perpendicularly the axis of symmetry of the closure clip. Equally however it is also possible for those surfaces to be arranged in two mutually intersecting planes that include an acute angle with the axis of symmetry of the closure clip.

When processing closure clips, besides the above-mentioned risk that cracks are formed on the closure clip after deformation thereof, another aspect of significance is that separation of the individual closure clip from a clip line formed from the closure clips can be done by applying the lowest possible forces and the resulting emission of noise that occurs in that case is low. To achieve that aim, the closure clip according to the invention can further have in the region of the front ends that face away from each other of the connecting extensions, constrictions which narrow in the direction of the front ends of the connecting extensions. That constriction or narrowing of the connecting extension in the direction of the free end thereof reduces the sliding resistance of the ram tool when the ram meets the closure clip as the connecting extensions that are angled through a small radius facilitate engagement of the curved ram. Furthermore, in the case of a closed clip, the connecting extensions produce at the top and at the inside a slight heart shape in which the connecting extensions bend inwardly due to the ram. That increases the strength of the closure clip.

In principle, the narrowing constrictions provided in the direction of the free ends of the connecting extensions can be achieved by different geometrical configurations. Thus, it is for example conceivable for the narrowing to be afforded by a configuration of a wedge shape in plan view, or however by two concave rounded configurations which face towards each other. It will be appreciated that any other configuration is also possible.

To securely close the product in bag or sausage form, the closure clip is plastically deformed around a portion of the packaging cover material, that is gathered together to form a plaited portion. The resistance of the closure clip to being pulled off the product in bag or sausage form, in the axial direction, is also determined on the basis of the magnitude of the closing force. To achieve an additional resistance, it can further be provided that at least one at least partially longitudinally extending profile recess is provided at the mutually facing surfaces of the clip bottom and the two clip legs. Preferably that profile recess extends at least approximately over the entire mutually facing surfaces of the clip bottom and the two clip legs.

To further increase the resistance to the closure clip being axially pulled off, besides a profile recess there can be provided a second one, with the two profile recesses preferably extending in mutually spaced parallel relationship.

In the case of only one profile recess, it is particularly advantageous if it extends along the central longitudinal axis of the mutually facing surfaces of the clip bottom and the clip legs. If in contrast there are two profile recesses, they can extend on both sides along the central longitudinal axis of the mutually facing surfaces of the clip bottom and the two clip legs.

The profile recess can be of different configurations. It is particularly advantageous if the profile recess is formed by an at least approximately V-shaped notch.

As have been discussed above, the clip line according to the invention consisting of mutually connected closure clips is formed in particular by the closure clips being connected together chain-like and preferably integrally at the connecting extensions provided at the free ends of the clip legs.

In order to facilitate processing of the closure clips that are assembled to form a line thereof, it is further advantageous if they are wound on to a roll.

As already mentioned above, the closure clips can be different sizes to be able to accommodate different requirements in terms of closing force, encirclement diameter and so forth. With each size of closure clip, it is necessary to provide a corresponding tool, in particular a corresponding female die. In the past that frequently led to problems insofar as an incorrect die was used for a given clip size.

The closure clips can be provided with a corresponding embossing that however can be wrongly interpreted or misunderstood by an operator. It is therefore advantageous if at least one machine-readable identification is provided on the roll. In such a situation it is possible that the machine handling with the closure clips can obtain the necessary items of information from that machine-readable identification and, in the case of a wrongly associated die, the machine can output a corresponding fault signal and stop operation.

In particular there is provided a die for processing closure clips according to the invention, wherein the die bottom, which at least partially holds the closure clip, has a rounding corresponding to the rounding in the form of part of a circular arc of the closure clip bottom. The rounded configuration of the die bottom provides that the die also grows with the respective size of clip, in other words a die is associated in relation to each closure clip so that it is possible to prevent what is referred to as overflowing of the clip material.

It should also be mentioned that the closure clip according to the invention permits a linear displacement travel for the closure tool or tools. In particular, the ram can be displaced in a straight line preferably perpendicularly from above on to the open closure clip that is lying horizontally in the die. When the ram meets the closure clip the latter rests in a fixed position in the die according to the invention. That means that, in contrast to the state of the art, it is possible to avoid lateral twisting of the closure clip, thereby reducing the reject rate of manufactured products. Furthermore that also reduces the loading on the machine processing the closure clips, and thus also reduces the wear-related costs thereof.

Further advantageous configurations and two embodiments by way of example of the closure clip according to the invention and an embodiment by way of example of a female die according to the invention are described hereinafter with reference to the accompanying drawings. The terms 'left', 'right', 'top' and 'bottom' used in the description relate to the drawings in an orientation with normally readable Figure identifications and references. In the drawings:

BRIEF DESCRIPTION OF THE DRAWING FIGURES

Figure 2:
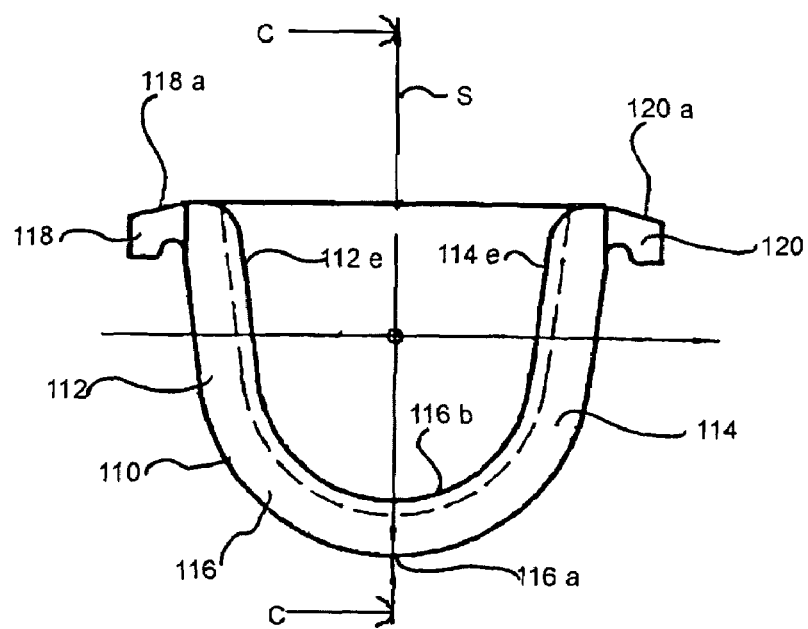
Figure 2:
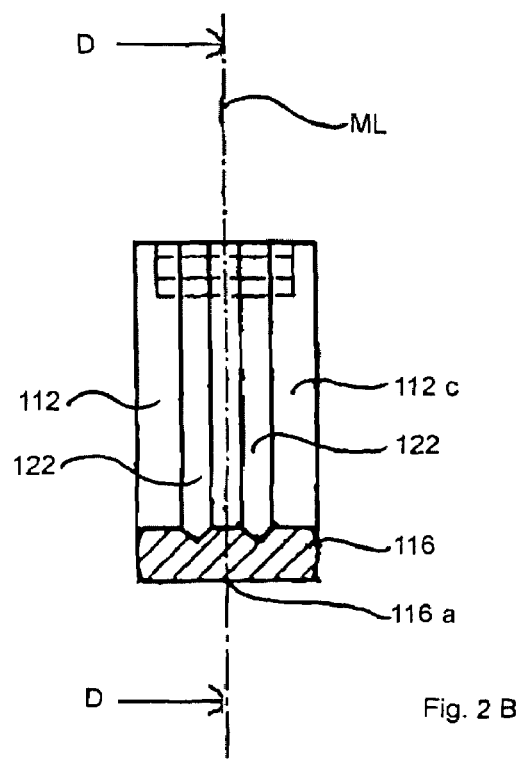
Figure 2:
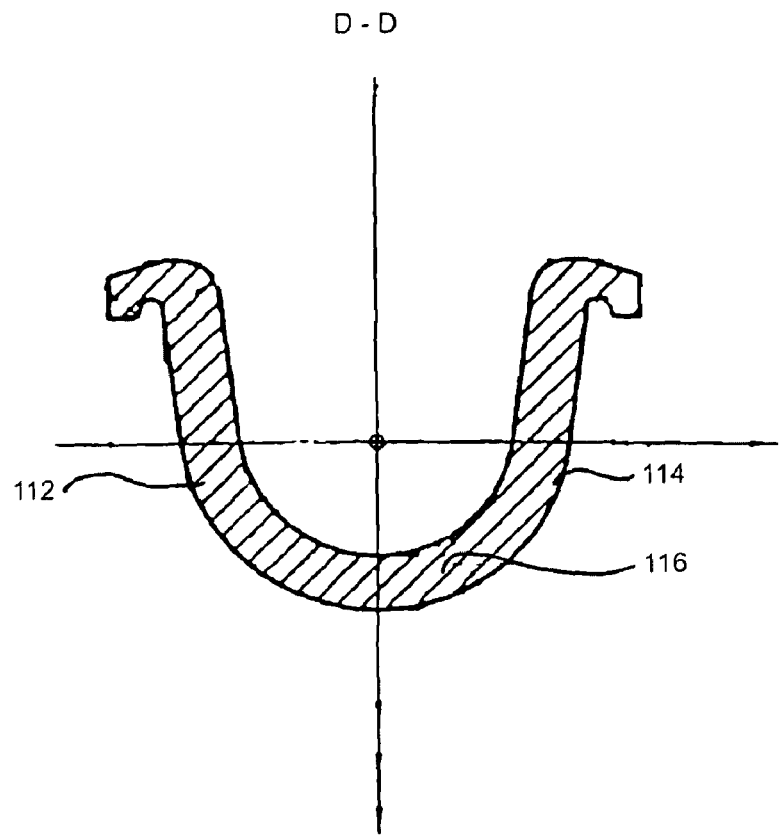
Figure 2:
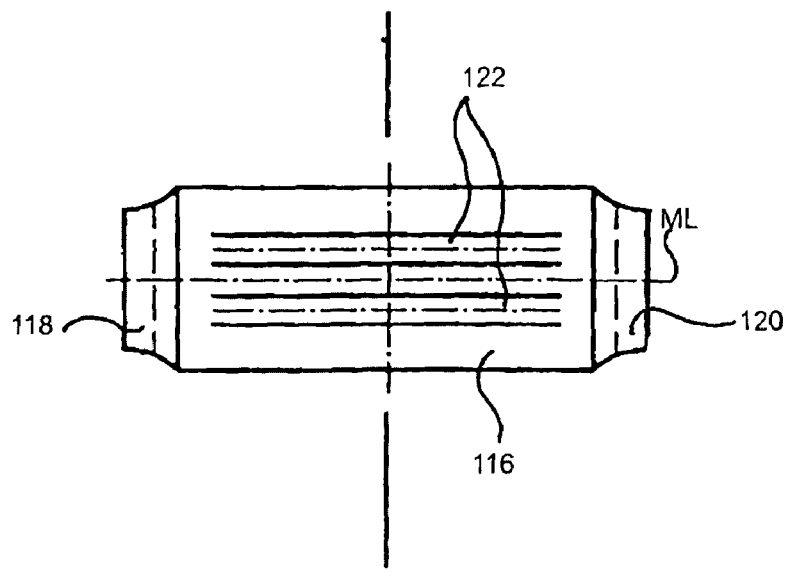
Figure 3:
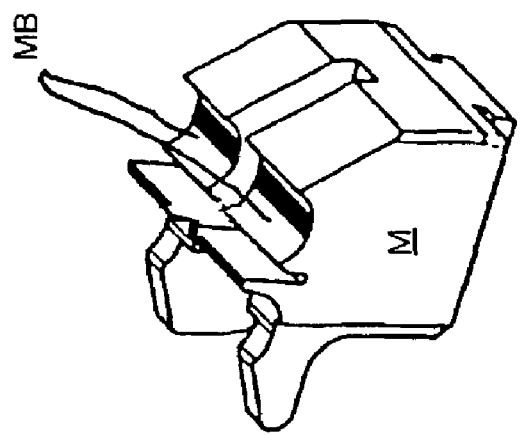
Figure 3:
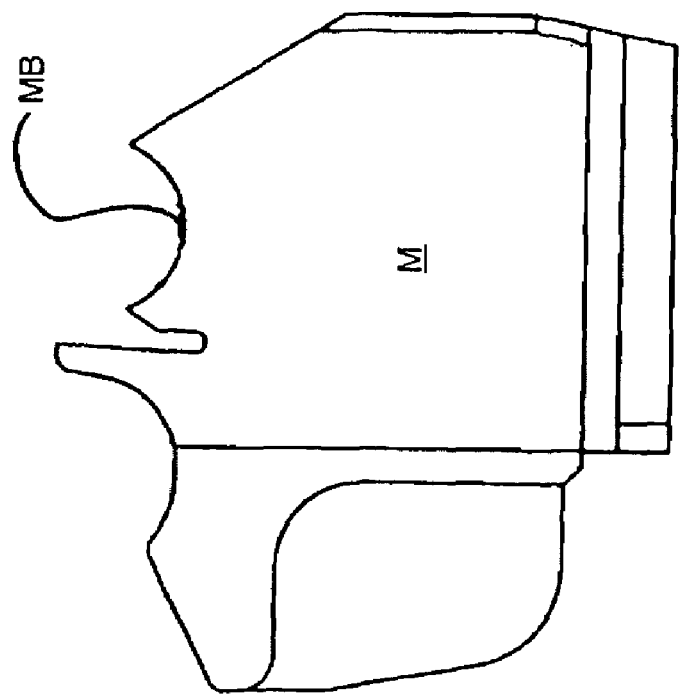

FIGS. 1A through 1D show various views or sections respectively of a first embodiment by way of example of a closure clip according to the invention, FIGS. 2A through 2D show various views or sections respectively of a second embodiment by way of example of a closure clip according to the invention, and FIGS. 3A and 3B show a side view and a perspective view of a die according to the invention.

DETAILED DESCRIPTION

The first embodiment shown in FIGS. 1A through 1D of a closure clip 10 according to the invention is made from an aluminum wire or aluminum sheet strip (it will be appreciated however that any other suitable material can also be used for manufacture of the closure clip 10). As can be seen in particular from FIGS. 1A and 1C, the closure clip 10 is in the shape of the letter 'V', although the two clip legs 12, 14 of the closure clip 10, which are at least approximately of equal length, do not meet at an acute angle but are joined together by a rounding in the form of part of a circular arc. That part-arcuate rounding forms the clip bottom 16 of the closure clip 10. As can also be seen from FIGS. 1A and 1C, the transitions from the clip bottom 16 to the two clip legs 12, 14 are uniform and steady, that is to say without a kink or crease or the like. The two clip legs 12, 14 extend upwardly from the part-arcuate rounding of the clip bottom 16 and in so doing diverge from each other.

The structure of the closure clip 10 in the plane in FIG. 1A has an axis-symmetrical configuration with respect to an axis of symmetry S that extends vertically in FIG. 1A, and is in the plane of FIG. 1A, and passes through the apex point 16a of the part-arcuate rounding of the clip bottom 16, as can be seen from FIG. 1A. Likewise the closure clip 10 in the plane in FIG. 1B is of an axis-symmetrical configuration in relation to the axis of symmetry S. Furthermore a central axes ML (See FIG. 1D) of the two clip legs 12, 14 and the axis of symmetry S and the part-circular area defined by the clip bottom 16 are in a common plane.

As can be seen from FIG. 1B the closure clip 10 has a cross-section of a flattened oval or elliptical configuration, the two longitudinal sides of the oval extending at least approximately parallel to the major axis of the ellipse forming the oval. As can further be seen from FIG. 1B the length of the minor axis of the ellipse is a multiple less than the major axis. In addition, the radius, provided at the vertices of the ellipse, for the vertex partial arc of the ellipse, is also a multiple less than the length of the major axis. Finally the two vertex partial arcs of the ellipse extend over an angle of 180°.

At their free ends 12a, 14a the clip legs 12, 14 are each provided with a respective bent-over portion 18, 20. The bent-over portions 18, 20 face outwardly at least approximately at an angle of 90° relative to the axis of symmetry S in opposite directions and are at least approximately of the same length. The two surfaces 18a, 20a of the bent-over portions 18, 20, which face away from the apex point 16a of the clip bottom 16, are in a common plane that intersects the axis of symmetry S at an angle of 90°. To produce the bent-over portions 18, 20 easily from a portion of the clip legs 12, 14, undercut configurations 18b, 20b are provided at the outside surfaces 12b, 14b of the clip legs 12, 14.

The bent-over portions serve as connecting extensions 18, 20 to which a respective further closure clip 10 can be joined with its associated connecting extension 20 and 18 respectively, to form a line (not shown) consisting of closure clips 10. The connection of mutually successive closure clips 10 of the line is integral, wherein separation of the succession closure clips 10 is effected centrally in each case at their common connecting extensions 18, 20 and 20, 18 respectively. It will be appreciated that one of the two connecting extensions 18, 20 of the illustrated closure clip 10 can also form the beginning of the clip line.

To reduce the cutting or severing force necessary to cut off successive closure clips 10 of a clip line and to reduce the level of noise emission that occurs, constrictions 18d, 20d (see FIG. 1D) are provided in the region of the free ends 18c, 20c of the connecting extensions 18, 20. As can be seen in particular from FIG. 1D, the two constrictions 18d, 20d are formed by two concave roundings that face away from each other and extend perpendicularly to the two surfaces 18a, 20a of the connecting extensions 18, 20. As a result, the connecting extensions 18, narrow in the direction of their free ends 18c, 20c symmetrically and uniformly in such a way that, in relation to successive closure clips 10 of a clip line in the region of the two integrally interconnected connecting extensions 18 and 20 respectively of the clips 10, there is a semicircular opening, in the region of which the severing cut is made. Preferably the severing cut extends along the straight lines of the two successive closure clips 10, which straight lines join together the two apex points of the common semicircular constrictions.

It is also to be noted that all edges of the closure clip 10 are rounded off, in order inter alia to avoid causing damage to the packaging cover material.

FIGS. 2A through 2D show a second embodiment by way of example of a closure clip 110 according to the invention. This closure clip 110 is of a structure that is geometrically similar but larger in its dimensions in relation to the closure clip 10 described with reference to FIGS. 1A through 1D so that hereinafter only the differences will be considered. In that respect functionally identical or geometrically similar portions of the closure clip 110 are denoted by the same references as were used for the closure clip 10 of the first embodiment, increased by 100.

As can be seen from FIGS. 2A and 2C, the surfaces 118a, 120a of the bent-over portions of the clip legs 112, 114 that form the connecting extensions 118, 120 are not in the same plane. Rather, those surfaces 118a, 120a include an acute angle with each other so that they extend inclinedly downwardly and their common angle apex lies in opposite relationship on the axis of symmetry S in relation to the apex point 116a of the clip bottom 116.

In addition, provided at the inside surfaces 112e, 114e, 116b of the clip legs 112, 114 and the clip bottom 116, there are two V-shaped profile recesses 122 arranged on both sides of the central longitudinal line ML of those surfaces 112e, 114e, 116b. It is to be noted that, in the projection in FIG. 2B, the central longitudinal axis ML of the inside surfaces 112e and 116b coincides with the axis of symmetry S. The spacing of the profile recesses 122, which extend in mutually parallel relationship and extend at least approximately over the entire length of those surfaces 112e, 114e, 116b, relative to each other and relative to the central longitudinal line ML, is smaller relative to the side edges (not identified) of the clip legs 112, 114 and the clip bottom 116. Those profile recesses 122 serve inter alia for providing for hooking engagement of the clip 110 closed around a gathered-together twisted plait portion of the packaging cover material, and the cover material.

FIGS. 3A and 3B show a perspective view and a side view of a die M according to the invention. That die M is of a usual structure with the difference that the die bottom MB has a rounding corresponding to the part-circular rounding of the clip bottom 16, 116. Transversely extending grooves are provided in the region of the apex point of the part-circular rounding of the die bottom MB in order to increase the fixing of the closure clip 10, 110 after separation thereof from the line of clips.

The invention claimed is:

1. A closure clip for products in bag or sausage form, the packaging cover material of which being formed from at least one packaging film, the closure clip comprising:
    a clip bottom; and
    two straight clip legs adjoined to the clip bottom in the same direction and diverge away from each other away from the clip bottom, a central longitudinal axes thereof and a central longitudinal axis of the clip bottom lying in a common plane,
    a central part of the clip bottom being rounded in the form of part of a circular arc,
    the closure clips forming a clip line by being interconnected chain-like at connecting extensions provided at the free ends of the clip legs, the clip line being wound on a roll, and roll having at least one machine-readable identification.

2. The closure clip of claim 1 where a transition between the clip bottom and the two clip legs is uniform.

3. The closure clip of claim 2 where the closure clip has a cross-section that is substantially in the shape of an ellipse, the length of the major axis of the ellipse is a multiple of the radius at the curvature sides.

4. The closure clip of claim 3 where ellipse has straight longitudinal sides extending at least approximately parallel to the first major axis of the ellipse.

5. The closure clip of claim 1 where the closure clip has a material thickness which remains at least approximately the same substantially over the entire length thereof.

6. The closure clip of claim 1 where the closure clip is made from a wire.

7. The closure clip of claim 1 where free ends of the clip legs form connecting extensions facing away from an axis of symmetry of the closure clip.

8. The closure clip of claim 7 where the connecting extensions are angled outwardly at an angle of at least approximately 90°.

9. The closure clip of claim 7 where the connecting extensions extend angled at an acute angle relative to the axis of symmetry.

10. The closure clip of claim 7 where surfaces of the connecting extensions, which surfaces face away from an apex point of the part-arcuate rounding of the clip bottom, are disposed at least partially in the same plane the perpendicularly intersects the axis of symmetry of the closure clip.

11. The closure clip of claim 7 where in the region of front ends of the connecting extension, which face away from each other, are constrictions that narrow in the direction of the front ends of the connecting extensions.

12. The closure clip of claim 1 where at least one longitudinally extending profile recess is provided at the mutually facing surfaces of the clip bottom and the two clip legs.

13. The closure clip of claim 12 where the profile recess extends at least approximately over the entire mutually facing surfaces of the clip bottom and the two clip legs.

14. The closure clip of claim 12 where at least two profile recesses are provided, the two profile recesses being parallel to one another.

15. The closure clip of claim 14 where the two profile recesses extend in mutually spaced relationship.

16. The closure clip of claim 14 where the two profile recesses extend on both sides along the central longitudinal axis of the mutually facing surfaces of the clip bottom and the two clip legs.

17. The closure clip of claim 12 where the profile recess extends along a central longitudinal axis of the mutually facing surfaces of the clip bottom and the two clip legs.

18. The closure clip of claim 12 where the profile recess has an at least approximately V-shaped notch.

19. A die for processing the closure clips of claim 1 where a die bottom configured for holding the closure clips has a rounded portion corresponding to the rounded bottom in the form of part of a circular arc of the closure clips.

\* \* \* \* \*